United States Patent
Shih et al.

(10) Patent No.: US 10,540,779 B2
(45) Date of Patent: Jan. 21, 2020

(54) POSTURE POSITIONING SYSTEM FOR MACHINE AND THE METHOD THEREOF

(71) Applicant: INDUSTRIAL TECHNOLOGY RESEARCH INSTITUTE, Hsin-Chu (TW)

(72) Inventors: Chih-Hsuan Shih, Changhua County (TW); Kuang-Yu Wu, New Taipei (TW); Shang-Kun Li, Taichung (TW); Shu Huang, Hsinchu County (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 30 days.

(21) Appl. No.: 15/847,089

(22) Filed: Dec. 19, 2017

(65) Prior Publication Data

US 2019/0139255 A1    May 9, 2019

(30) Foreign Application Priority Data

Nov. 3, 2017    (TW) .............................. 106138185 A

(51) Int. Cl.
*G06K 9/00*    (2006.01)
*G06T 7/70*    (2017.01)
(Continued)

(52) U.S. Cl.
CPC ............... *G06T 7/70* (2017.01); *B25J 9/1664* (2013.01); *B25J 9/1697* (2013.01); *G05B 19/02* (2013.01);
(Continued)

(58) Field of Classification Search
CPC .... G06F 19/00; G06F 3/04815; Y10S 901/01; G06K 9/00664; G06T 2200/04; G06T 2207/10028
See application file for complete search history.

(56) References Cited

U.S. PATENT DOCUMENTS 9,346,164 B1    5/2016  Edsinger et al.
9,522,471 B2   12/2016  Kuffner, Jr. et al.
(Continued)

FOREIGN PATENT DOCUMENTS

CN    101493682 A    7/2009
CN    103302666 A    9/2013
(Continued)

OTHER PUBLICATIONS

Intellectual Property Office Ministry of Economic Affairs, R.O.C., "Office Action", dated Feb. 7, 2018, Taiwan.
(Continued)

*Primary Examiner* — Vu Le
*Assistant Examiner* — Guillermo M Rivera-Martinez
(74) *Attorney, Agent, or Firm* — Locke Lord LLP; Tim Tingkang Xia, Esq.

(57) ABSTRACT

A posture positioning system for machine and the method thereof are provided. The system mainly consists of at least a depth camera mount on a robot to scan points of cloud of the machine, and a processing unit to apply an algorithm with the points of cloud and a contour vector file of the machine to obtain a transfer relationship. The processing unit further obtains a spatial relationship by a matrix calculation with the transfer relationship and a position relationship which exists between the robot and the depth camera. A route generating module of the processing unit generates, if needed, a moving route for the robot according to the spatial relationship.

13 Claims, 4 Drawing Sheets

(51) Int. Cl.
*H04N 5/225* (2006.01)
*B25J 9/16* (2006.01)
*H04N 13/204* (2018.01)
*G05B 19/02* (2006.01)

(52) U.S. Cl.
CPC ......... *H04N 5/2253* (2013.01); *H04N 5/2257* (2013.01); *H04N 13/204* (2018.05); *G06T 2207/10028* (2013.01); *Y10S 901/09* (2013.01); *Y10S 901/47* (2013.01)

(56) References Cited

U.S. PATENT DOCUMENTS

| | | | |
|---|---|---|---|
| 2006/0152533 A1* | 7/2006 | Read | B25J 9/1671 345/653 |
| 2013/0114886 A1* | 5/2013 | Kotake | G01B 11/002 382/154 |
| 2013/0231779 A1* | 9/2013 | Purkayastha | B25J 9/1697 700/259 |
| 2013/0238128 A1* | 9/2013 | Suzuki | B25J 9/1669 700/258 |
| 2016/0207199 A1* | 7/2016 | Kuffner, Jr. | B25J 9/1676 |
| 2017/0136626 A1* | 5/2017 | Wang | G06T 7/74 |
| 2018/0350101 A1* | 12/2018 | Glover | G06T 7/74 |

FOREIGN PATENT DOCUMENTS

| | | |
|---|---|---|
| CN | 103959012 A | 7/2014 |
| CN | 105643399 A | 6/2016 |
| CN | 106600681 A | 4/2017 |
| EP | 2821872 B1 | 7/2013 |
| TW | 200930523 A | 7/2009 |
| TW | I322341 B | 3/2010 |
| TW | I438396 B | 5/2014 |
| TW | M540733 U | 5/2017 |

OTHER PUBLICATIONS

Bjorn Solvang et al., Vision based robot programming, IEEE International Conference on Networking, Sensing and Control, 2008.
Guifang Zhang et al., 3D curvature grinding path planning based on point cloud data, IEEE, 2016.
Wen-Iong Li et al., 3-D Shape Matching of a Blade Surface in Robotic Grinding Applications, IEEE, 2016.
Jianhua Su et al., A method of human-robot collaboration for grinding of workpieces, IEEE, 2015.
Julian Ricardo Diaz Posada et al., Automatic Motion Generation for Robotic Milling Optimizing Stiffness with Sample-Based Planning, Machines, 2017, 5, 3.
Julian Ricardo Diaz Posada et al., Automatic Programming and Control for Robotic Deburring, VDE, 2016.
Alexander Kuss et al., Detection of workpiece shape deviations for tool path adaptation in robotic deburring systems, Procedia CIRP, 2016, 57, pp. 545-550.

\* cited by examiner

POSTURE POSITIONING SYSTEM FOR MACHINE AND THE METHOD THEREOF

CROSS REFERENCE TO RELATED APPLICATION

This application also claims priority to Taiwan Patent Application No. 106138185 filed in the Taiwan Patent Office on Nov. 3, 2017, the entire content of which is incorporated herein by reference.

TECHNICAL FIELD

The present disclosure relates to a posture positioning system and method, and more particularly, to a posture positioning system and method using a depth camera to scan various machines for obtaining related information.

BACKGROUND

In recent years, the applications of robots in all kinds of operations enabled by various machines generally can only be achieved after the processing steps and moving trajectories of the robots are properly established and simulated. However, such step establishment and simulation are usually accomplished in a step-by-step manual manner, such that the production using such machines with robots can sometimes be severely affected and delayed since not only the programming of those robots requires specific know-how and experience, but also it can be very time-consuming. In addition, even after the programming had already be done in a pre-production operation, operation errors can still happen in reality as the robotic simulation might be erroneous and thus is not in consistency with the actual operations, or as the pre-programmed trajectories or positioning for those robots may no longer valid when there are wear-and-tear or parts being changed in the machines.

Therefore, it is in need of a posture positioning system and method for machines that can be enabled rapidly and accurately.

SUMMARY

The present disclosure provides a posture positioning system for machine and the method thereof, which are adapted for obtaining a spatial relationship between a robot and at least one machine. The system mainly consists of at least a depth camera and at least a processing unit, in which the depth camera is mounted on the robot or other positions to scan points of cloud of the machine and a contour vector file of the machine, and the processing unit is used to received the points of cloud of the machine so as to apply an algorithm using the points of cloud and the contour vector file of the machine to obtain a transfer relationship, and thereafter, the processing unit further obtains a spatial relationship by a matrix calculation using the transfer relationship and a position relationship which exists between the robot and the depth camera so as to plan, simulate or generate a moving route of the robot according to the spatial relationship.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
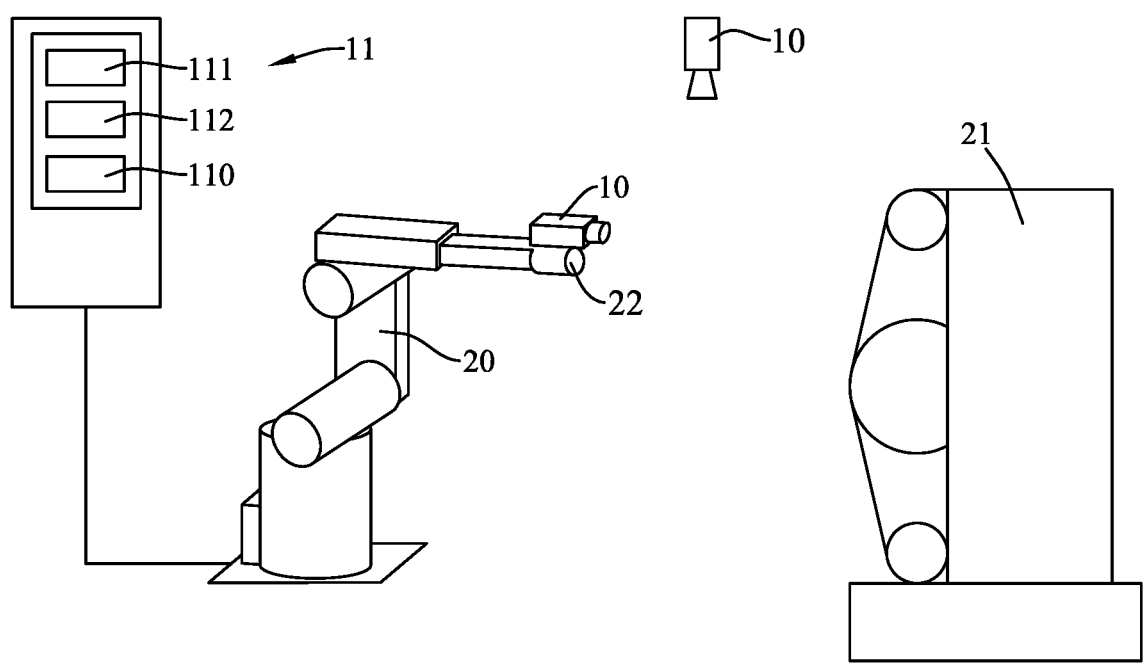
FIG. 1 is a schematic diagram showing the operation of a posture positioning system for machine according to the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Please refer to FIG. 1, which is a schematic diagram showing the operation of a posture positioning system for machine according to the present disclosure. In FIG. 1, a posture positioning method that is adapted for determining a spatial relationship between at least one machine 21 and a robot 20, whereas, the machine 21 can be a pipe polishing machine, and the posture positioning system can primarily be composed of an imaging unit 10 and a processing unit 11.

In an embodiment, the imaging unit 10 is substantially a depth camera that is mounted to a distal end 22 of the robot 20, or even being disposed at any position inside an ambient space, whichever is provided for enabling a position relationship to be existed between the imaging unit 10 and the robot 20. It is noted that the position relationship can be defined by a transformation matrix relating to the relative positioning of the imaging unit 10 and the robot 20 inside the ambient space. Thereby, the imaging unit 10 can be used for scanning and obtaining a 3D spatial-depth information of the at least one machine 21 or a 3D contour point cloud of the at least one machine 21, wherein such information that is being scanned and obtained can represent the actual distances or relative postures between the robot 20 or the imaging unit 10 to various parts of the machine 21.

The processing unit 11 is connected to the imaging unit 10 while being used for controlling the robot 20 to perform a scan operation, and then being enabled to apply an algorithm using the 3D spatial-depth information and a vector information of the machine 21 for obtaining a transfer relationship. It is noted that the vector information can be a 3D contour design information, such as an accurate 3D contour graphic; and the transfer relationship is a position transformation matrix. After obtaining the transfer relationship, the spatial relationship between the robot 20 and the machine 21 can be established using the transfer relationship and the aforesaid position relationship. Moreover, the spatial relationship can also be a position transformation matrix that not only represent actual distances and postures, but also can represent the actual contours and positions of the machine 21 in relative to the robot 20. Finally, a moving route or a machining route can be simulated or defined selectively basing upon the spatial relationship.

In an embodiment, the processing unit 11 is primarily composed of a calculation module 110, a storage module 111 and a route generating module 112. The calculation module 110 is used for receiving the spatial-depth information or the 3D point cloud from the imaging unit 10 and the vector information or the 3D graphic that is stored in the storage module 112, so as to be used in a calculation for obtaining the transfer relationship, and then use the transfer relationship and the position relationship to establish the spatial relationship. The route generating module 112 is used for generating the moving route or the machining route of the robot 20 according to the spatial relationship.

Figure 2:
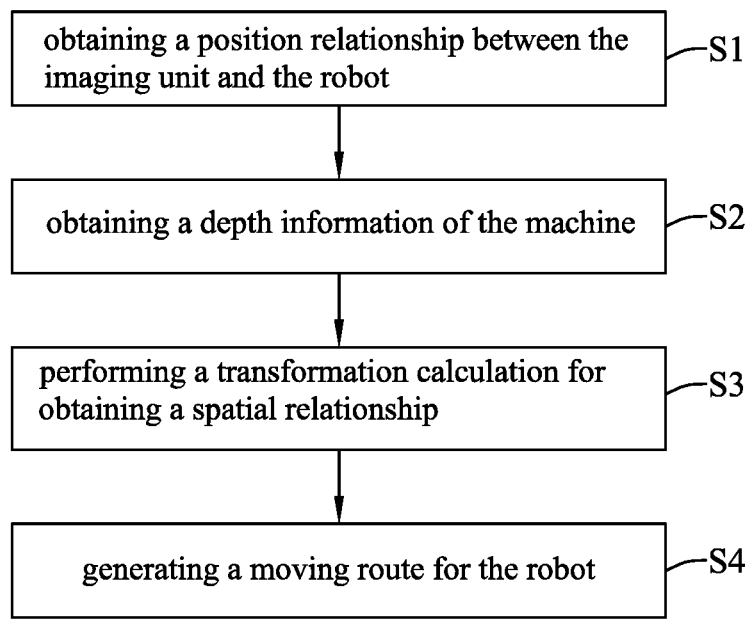
FIG. 2 is a flow chart depicting steps performed in a posture positioning method for machine according to the present disclosure.

Please refer to FIG. 2, which is a flow chart depicting steps performed in a posture positioning method for machine according to the present disclosure. In FIG. 2, the method that is performed using the processing unit 11 starts at the step S1. In step S1, a position relationship between the imaging unit 10 and the robot 20 is obtained. Further as shown in FIG. 3 and FIG. 4, the detail steps S1A, S1B and S1C for obtaining the position relationship are disclosed.

At the step S1A, point clouds of calibration are collected, that is, a process for scanning a calibration template or a specific object is enabled for obtaining multiple point clouds relating to the relative positioning of the robot 20 and the imaging unit 10, and thus the so-obtained point clouds can be provided for enabling the imaging unit 10 to perform a calibration operation.

Figure 3:
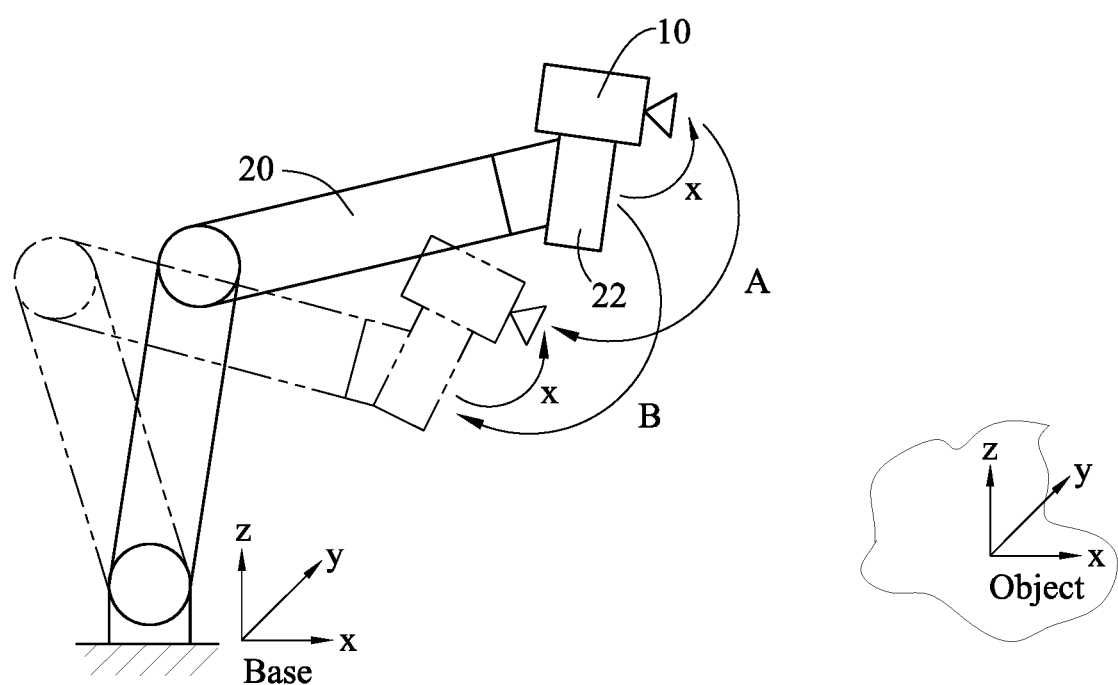
FIG. 3 is a schematic diagram shown the calibration of eye-in-hand coordination in the present disclosure.
Figure 4:
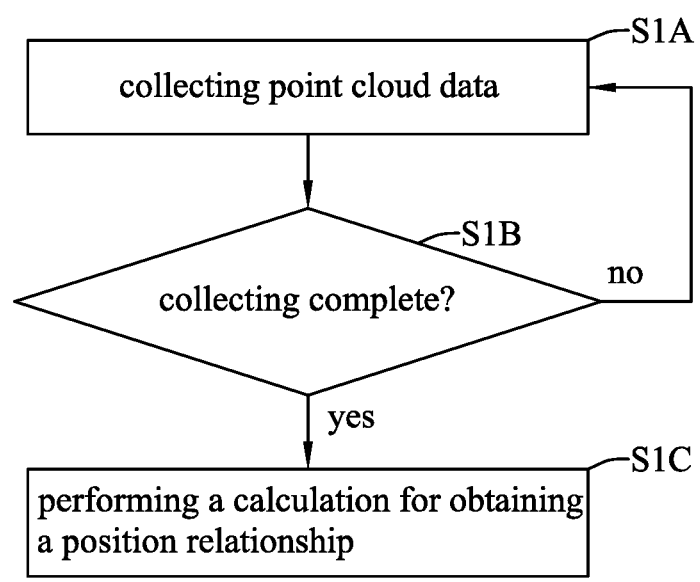
FIG. 4 is a flow chart depicting steps performed for obtaining an eye-to-hand positioning relationship in the present disclosure.

As shown in FIG. 1 and FIG. 3, the imaging unit 10 is mounted on the robot 20 for calibration, so that the robot 20 should be actuate to move between at least two positions or to have its posture changed while allowing the scanning to the calibration template or the specific object to be enabled, and during the scanning, related point clouds are registered so as to obtained at least one set of position transformation matrices A and B relating respectively to the imaging unit 10 and the distal end 22 of the robot 20. It is noted that the position transformation matrix A represents the transfer relationship between the imaging unit of different postures, while the position transformation matrix B represents the transfer relationship between the distal end 22 of the robot 20 at different postures.

Moreover, in step S1A, the imaging unit 10 can be disposed in an eye-in-hand position, i.e. the imaging unit 20 is mounted on the robot 20, or the imaging unit 10 can be disposed in an eye-to-hand position, i.e. the imaging unit 20 is disposed at a position other than being mounted to the robot 20.

For the eye-in-hand configuration, the imaging unit is placed at any position on the robot 20 while the position relationship between the distal end 22 of the robot 20 and the imaging unit 10 is calculated and obtained. Thereafter, a calibration method can be performed by enabling the robot 20 to move from any random position in space to another random position while registering a transformation matrix between robot coordinate of the robot 20 and the base coordinate of the robot 20 and also registering another transformation matrix for an object coordinate of a calibration datum plane that is captured by an external depth camera.

At step S1B, an evaluation is performed for determining whether the data of point cloud is complete? If not, the process is redirected back to step S1A; otherwise, the process proceeds to step S1C.

At step S1C, a position relationship is calculated and obtained; that is, a closed-form transformation matrix equation AX=XB is used for obtaining the solution of the matrix X, which represents substantially the position relationship between the distal end 22 of the robot 20 and the imaging unit 10.

It is noted that after the coordinate geometry relationship between the robot 10 and the imaging unit had been established and also a massive amount of data relating to specific point clouds and postures of the robot 20 had been collected, a minimization calculation is performed for calculating the spatial translation and rotation matrices between the distal end 22 of the robot 20 and the imaging unit 10, which represents the aforesaid position relationship. In the disclosure, the Levenberg-Marquardt algorithm is used for generating the spatial translation and rotation matrices.

At the step S2, a depth information of the machine is obtained. In this step, the processing unit 11 control the robot 20 to move while directing the imaging unit 10 to scan the machine 21 for obtaining the depth information of the machine 21 in a form of 3D point cloud or 3D mesh. It is noted that the obtained depth information represents the actual relative distance or posture between the imaging unit 10 and the machine 21.

In detail, the imaging unit 10 is being brought along to move rapidly with robot 20 while scanning the contour of the machine 21 for obtaining a partial 3D point cloud of the machine 21, and then the acquired partial 3D point cloud is fed to an algorithm as input for comparing and matching a CAD model or vector data of the machine 21.

Moreover, in step S2, if the CAD model or vector data of the machine 21 is not available, the machine is subjected to a complete and accurate depth scan in advance for obtaining a full 3D contour point cloud of the machine 21 to be used as the reference similar to the CAD model or vector data in the calculation of the algorithm.

At step S3, a transformation calculation is performed for obtaining a spatial relationship. In this step, an algorithm is used for comparing and matching the full CAD model, vector data, or 3D point cloud of the machine 21 with the scanned depth information of 3D point cloud or 3D mesh relating to the machine 21. In an embodiment, an Iterative Closest Point (ICP) algorithm of calibration and alignment is used for obtaining a transfer relationship.

In this embodiment, before the algorithm for comparing and matching the full CAD model or vector data of the machine 21 with the scanned depth information of 3D contour point cloud can be performed, the scanned depth information of 3D contour point cloud relating to the machine 21 should be acquired in advance from the imaging unit 10 so as to be fed to the processing unit 11 to be used in it calculation module for the comparison and matching with the full CAD model of the machine 21. It is noted that before the comparison and matching can be enabled, the CAD model of the machine 21 should be set to be a target data in advance, while allowing the scanned depth information of 3D contour point cloud relating to the machine 21 to be set as a source data, in that as the target data and the source data are represented as point sets P and Q, the following steps is proceeded:
1. calculating the centers of mass relating to P and Q in respective.
2. transferring the difference between two clouds of points into a cross-covariance matrix $\Sigma_{pq}$.
3. generating a symmetric matrix $Q(\Sigma_{pq})$ according to $\Sigma_{pq}$.
4. solving the symmetric matrix $Q(\Sigma_{pq})$ to obtain a maximum eigenvalue and its related eigenvectors (w, m, n, p), which are corresponding to a quaternion vector $\vec{q}_R$.
5. generating a 3D spatial rotation matrix $R(\vec{q}_R)$.
6. calculating a translation matrix $\vec{q}_T$, and then using an iteration-limited or error-limited iterative method to generate a position transformation matrix, i.e. the aforesaid transfer relationship.
7. generating a matrix product of the transfer relationship and the position relationship so as to obtain a spatial relationship, whereas the transfer relationship, the position relationship and the spatial relationship are all 4×4 position transformation matrices.

In another embodiment, if the point cloud that is obtained by the imaging unit 10 includes not only information of space, but also color information, the color information can be used for strengthening the point cloud of the machine in the comparing and matching operation with the CAD model. Therefore, a data structure of k-d tree can be used for speeding the data collection of neighboring points, so that the algorithm can converge with less iterations, It is noted that method for calculation color distance includes Euclidean distance and Mahalanobis distance.

At step S4, a moving route of the robot is generated. For instance, a movement simulation of the robot is performed for enabling a checking of singularity, a checking of soft-max and soft-min, and a geometric interference checking so as to generate an efficient and realistic moving route for the robot.

Taking a pipe polishing machine for instance, after the coordination transformation between cutting tool had been set and also the positions of polishing equipments and corresponding polishing points had been defined, a simulated polishing route can be generated and simulated in a simulator for enabling a checking of soft-max and soft-min, and a geometric interference checking, and if the checking indicates interferences, an alarm will be issued for informing its users to correct the polishing route.

In the step S1~S3, the relative positioning and posture between the robot and the machine is defined and ensured, and then in the step S4, a machining process can be selected and planed.

To sum up, the present disclosure uses an imaging unit 10 that is mounted on a robot 20 to scan point cloud data or depth information of a machine 21, and then the obtain depth information is compared with a contour vector file of the machine 21 for obtaining a transfer relationship, and thereafter, a spatial relationship is calculation using the position relation between the robot 20 and the imaging unit 10 for matching the realistic partial 3D point cloud of the machine 21 perfectly with the 3D graphic of the machine 21, so that a moving route of the robot 20 can be as to planed, simulated or generated according to the spatial relationship.

For production facilities, the use of the system and method of the present disclosure can cause an effective production route to be generated effectively and rapidly, by that the machine tuning time can be shortened, and also for the pipe polishing machine, the wear-and-tear of the pipe can be compensated via auto-route compensation.

For system manufacturers, the present disclosure can provide a complete production flow, and moreover, if a CAD model is available, the posture of the machine can be estimated using the present disclosure, and if not, a 3D model of the machine can be reconstructed using the present disclosure.

For simulation software manufacturers, the present disclosure provides a virtue simulation means for machine calibration and expansion, that can be used as a third-party CAD software.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:
1. A posture positioning system for machine, adapted to be applied on a robot, comprising:
at least an imaging unit, configured to obtain a depth information of a machine, the machine comprises a pipe polishing machine, wherein the imaging unit is mounted on the robot to scan the depth information of the machine: and
a processing unit, configured to receive the depth information and then apply an algorithm using the depth information and a vector information of the machine to obtain a transfer relationship, and to calculate and obtain a spatial relationship basing based upon the transfer relationship and a position relationship;
wherein the vector information is a 3D computer graphic of the machine;
wherein the depth information is a 3D color point cloud of the machine, a 3D spatial-depth information of the machine, or a 3D mesh: and
wherein the spatial relationship is calculated using a position relation between the robot and the imaging unit for matching a realistic partial 3D point cloud of the machine with the 3D computer graphic of the machine.
2. The system of claim 1, wherein the imaging unit is a depth camera.
3. The system of claim 1, wherein the processing unit further comprises:
a calculation module, for executing the algorithm;
a storage module, for storing the vector information; and
a route generating module, for generating a moving route for the robot.
4. The system of claim 1, wherein the position relationship is a position transformation matrix between the imaging unit and a distal end of the robot.
5. The system of claim 1, wherein the transfer relationship is a position transformation matrix.
6. The system of claim 1, wherein the spatial relationship is a matrix product of the transfer relationship and the position relationship.
7. The system of claim 1, wherein the algorithm is an iterative closest point (ICP) algorithm.
8. A posture positioning method for machine, adapted to be applied on a robot while being executed by a processing unit, comprising the steps of: receiving a depth information of a machine that is obtained by the use of an imaging unit mounted on the robot to scan the depth information of the machine, the machine comprises a pipe polishing machine:
    applying an algorithm using the depth information and a vector information of the machine to obtain a transfer relationship;
    obtaining a spatial relationship basing based upon the transfer relationship and a position relationship;
    wherein the vector information is a 3D computer graphic of the machine;
    wherein the depth information is a 3D color point cloud of the machine, a 3D spatial-depth information of the machine, or a 3D mesh: and
    wherein the spatial relationship is calculated using a position relation between the robot and the imaging unit for matching a realistic partial 3D point cloud of the machine with the 3D computer graphic of the machine.

9. The method of claim 8, wherein the position relationship is a position transformation matrix between the imaging unit and a distal end of the robot.

10. The method of claim 8, wherein the transfer relationship is a position transformation matrix.

11. The method of claim 8, wherein the spatial relationship is a matrix product of the transfer relationship and the position relationship.

12. The method of claim 8, wherein the algorithm is an iterative closest point (ICP) algorithm.

13. The method of claim 8, wherein after obtaining the spatial relationship, the method further comprises the step of:
    generating a moving route for the robot according to the spatial relationship.

\* \* \* \* \*